United States Patent
DiNicola et al.

(10) Patent No.: US 6,700,876 B1
(45) Date of Patent: Mar. 2, 2004

(54) CONGESTION MONITORING AND MESSAGE FLOW CONTROL IN A BLOCKING NETWORK

(75) Inventors: Paul D. DiNicola, Hurley, NY (US); Rama Krishna Govindaraju, Poughkeepsie, NY (US); Mandayam Thondanur Raghunath, Poughkeepsie, NY (US); Gautam H. Shah, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/354,750

(22) Filed: Jul. 29, 1999

(51) Int. Cl.$^7$ .................................................. H04J 1/16
(52) U.S. Cl. ........................ 370/252; 370/230; 370/282
(58) Field of Search ................................ 370/230, 231, 370/236.1, 248, 232, 236, 230.1, 247, 235, 252, 282; 709/235, 233, 224, 238

(56) References Cited

U.S. PATENT DOCUMENTS

| | | | |
|---|---|---|---|
| 5,029,164 A | 7/1991 | Goldstein et al. | 370/235 |
| 5,193,151 A | 3/1993 | Jain | 709/237 |
| 5,276,677 A | 1/1994 | Ramamurthy et al. | 370/232 |
| 5,400,329 A | 3/1995 | Tokura et al. | 370/232 |
| 5,563,875 A | 10/1996 | Hefel et al. | 370/249 |
| 5,781,554 A | 7/1998 | Organ | 370/474 |
| 6,038,216 A * | 3/2000 | Packer | 370/231 |
| 6,292,465 B1 * | 9/2001 | Vaid et al. | 370/230 |

FOREIGN PATENT DOCUMENTS

JP 9224025 A 8/1997

OTHER PUBLICATIONS

"Dynamic Computation of TCP Maximum Window Size for Directly Connected Hosts," IBM Technical Disclosure Bulletin, Vol 37, No. 04A, Apr. 1994, p. 601.

* cited by examiner

Primary Examiner—John Pezzlo
(74) Attorney, Agent, or Firm—Lawrence D. Cutter, Esq.; Kevin P. Radigan, Esq.; Heslin Rothenberg Farley & Mesiti P.C.

(57) ABSTRACT

Method, system and program storage device are provided for monitoring and ameliorating congestion in a tightly coupled network. Commensurate with sending a packet into the network, a first time stamp is recorded. Upon receipt of an acknowledgment back across the network responsive to sending of the packet, a second time stamp is recorded. The round trip time of the packet is determined and an amount of congestion is estimated using the determined round trip time and a statically predetermined round trip representative of at least one of no network congestion or a known degree of network congestion. The number of flow control tokens for the destination node can be dynamically varied in response to the estimate of the amount of network congestion. If desired, monitoring and estimating of network congestion can be initiated only after identifying the existence of network congestion, for example, represented by a lack of flow control tokens at a sender node for a destination node.

41 Claims, 2 Drawing Sheets

CONGESTION MONITORING AND MESSAGE FLOW CONTROL IN A BLOCKING NETWORK

TECHNICAL FIELD

This application relates to message processing systems, and more particularly, to techniques for identifying and minimizing congestion in a tightly coupled message processing system interconnected by a blocking network.

BACKGROUND OF THE INVENTION

Network traffic in a message processing system frequently tends to be distributed in an uneven manner resulting in a significant amount of traffic going through a small subset of the network. This imbalance in load is referred to as "network congestion." Traditionally, network components (such as routers) react to congestion by dropping packets. The communication protocol stacks react to dropped packets by reducing the traffic rate so that the load through the congested portion of the network drops to an acceptable rate. Such a network is referred to as a packet dropping network.

In high speed networks (for example, certain switching networks) routers do not drop packets in the presence of congestion. Instead, back-pressure is applied to upstream routers of the network. In other words, routers block traffic instead of dropping packets. The design point of blocking versus dropping is chosen to ensure that the communication protocol stacks can operate faster since the stacks can assume that all injected packets get to their destination with very high probability. These tightly coupled networks are referred to as blocking networks.

DISCLOSURE OF THE INVENTION

Blocking networks pose a problem with respect to congestion avoidance because the communication protocol does not receive an indication of traffic congestion (i.e., lost packets). Instead, congestion results in increased transit times. Traditional network protocols like TCP/IP react to increased transit times by increasing the amount of network traffic because they interpret increased transit time as a longer network pipeline.

In blocking networks, the traditional approach to congestion has been to simply live with the problem, or to partition the network into non-overlapping sections so that congestion in one partition does not effect other partitions. Another scheme is to use virtual channels to create the impression of multiple independent networks, and to contain the congestion within each virtual channel plane. The partitioning method is difficult to apply when different applications need to communicate between the same set of nodes, or the same application needs to communicate with different node sets. The virtual channel approach needs additional hardware resources in the routers, and is therefore limited in scope.

It is desirable to avoid,congestion in blocking networks because network congestion results in a significant drop in performance for all users of the network. Specifically, when congestion occurs, all network traffic that has to transit through the congested region can be slowed down drastically. If different traffic types share the same blocking network, congestion caused by one traffic type can effect other traffic types, which is clearly undesirable.

Thus presented herein, in one aspect, is a method for monitoring congestion in a network, such as a blocking network. The method includes: sending a packet into the network, and associated therewith recording a first time stamp; receiving an acknowledgment back across the network responsive to the sending of the packet, and recording a second time stamp with receipt of the acknowledgment; determining a round-trip time of the packet and acknowledgment across the network using the first time stamp and the second time stamp, wherein the round-trip time is indicative of an amount of congestion in the network; and estimating the amount of congestion in the network using the determined round-trip time, wherein the estimating comprises comparing the determined round-trip time with a predetermined round-trip time representative of no network congestion or a known degree of network congestion.

In another aspect, a method for ameliorating congestion in a network is provided. This method includes: identifying when the network is congested between a sender node and a destination node; subsequent to the identifying, ascertaining a round-trip time of a packet and a corresponding return acknowledgment sent between the sender node and the destination node across the network; and varying a number of flow control tokens at the sender node for the destination node using the ascertained round-trip time.

In still another aspect, a system for monitoring congestion in a network is provided. This system includes means for sending a packet into the network and for recording a first time stamp based thereon, as well as means for receiving an acknowledgment back across the network responsive to the packet, and for recording a second time stamp with receipt of the acknowledgment. The system further includes: means for determining a round-trip time of the packet and the acknowledgment across the network using the first time stamp and the second time stamp, wherein the round-trip time is indicative of an amount of congestion in the network; and means for estimating the amount of congestion in the network using the determined round-trip time, wherein the means for estimating comprises means for comparing the determined round-trip time with a predetermined round-trip time representative of no network congestion or a known amount of network congestion.

In yet another aspect, a system for ameliorating congestion in a network is provided. The system includes means for identifying when the network is congested between a sender node and a destination node, and means for ascertaining a round-trip time of a packet and a corresponding return acknowledgment sent between the sender node and the destination node across the network subsequent to identifying that the network is congested. The system further includes means for varying the number of flow control tokens at the sender node for the destination node using the ascertained round-trip time.

In a further aspect, the invention comprises at least one program storage device readable by a machine, tangibly embodying at least one program of instructions executable by the machine to perform a method of monitoring congestion in a network. The method includes: sending a packet into the network, and recording a first time stamp based thereon; receiving an acknowledgment back across the network responsive to the packet, and recording a second time stamp with receipt of the acknowledgment; determining a round-trip time of the packet and acknowledgment across the network using the first time stamp and the second time stamp, wherein the round-trip time is indicative of an amount of congestion in the network; and estimating the amount of congestion in the network using the determined round-trip time, wherein the estimating comprises comparing the determined round-trip time with a predetermined round-trip time representative of no network congestion or a known degree of network congestion.

In a still further aspect, the invention includes at least one program storage device readable by a machine, tangibly embodying at least one program of instructions executable by the machine to perform a method of ameliorating congestion in a network. The method includes: identifying when the network is congested between a sender node and a destination node; subsequent to the identifying, ascertaining a round-trip time of a packet and corresponding return acknowledgment sent between the sender node and the destination node across the network; and varying the number of flow control tokens at the sender node for the destination node using the ascertained round-trip time.

To restate, presented herein is an approach for monitoring and minimizing congestion in a tightly coupled (i.e., blocking) network. The approach comprises a protocol-based approach that can be readily implemented on existing blocking networks. Traditional congestion avoidance schemes based on lost packets are not applicable to blocking networks since blocking networks do not drop packets in the presence of congestion. Rather, the approach presented herein relies upon an observed round-trip timed to detect and avoid congestion. Thus, there is no overhead for lost packets and retransmission of lost packets, in order to detect and avoid or recover from congestion.

Advantageously, the approach presented herein ameliorates network congestion without the need to partition the network into subsections. Further, if a blocking network is not partitioned, and is shared by multiple applications, a single application congesting the network could adversely effect other applications using the network at that time. The approach presented herein prevents this from happening by alleviating an application from congesting the network for other applications.

In a normal case, where there is no network congestion, the technique presented herein imposes no protocol overhead in terms of taking time stamps, etc. It is only when a sending processor runs out of flow control tokens (i.e., upon initiation of congestion), that the extra cost of taking time stamps and measuring the round-trip time is performed. The packets sent across the network do not need to carry any additional data to implement the congestion avoidance scheme of this invention. The only requirement is that there be an ability to match up the packet and its acknowledgment, which is usually inherent in most existing communication protocols in the sending side state. All time-stamping and round-trip time measurements are local to a sending node. Thus, payload per packet is not effected. Further, there is no need for any synchronizing of clocks between senders and receivers. The clocks can be out of sync by any amount since time intervals are only measured relative to one clock at the sender. The approach presented herein is tunable to a wide variety of network sizes and a wide variety of network latencies by appropriately setting the time delay and token count parameters. Further, it is only necessary to tune once per closely-coupled network configuration. The approach presented herein does not require any coordination between applications using the shared network to detect and avoid congestion. State maintenance to implement the scheme presented is local to each application, thereby making implementation simpler and more efficient.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
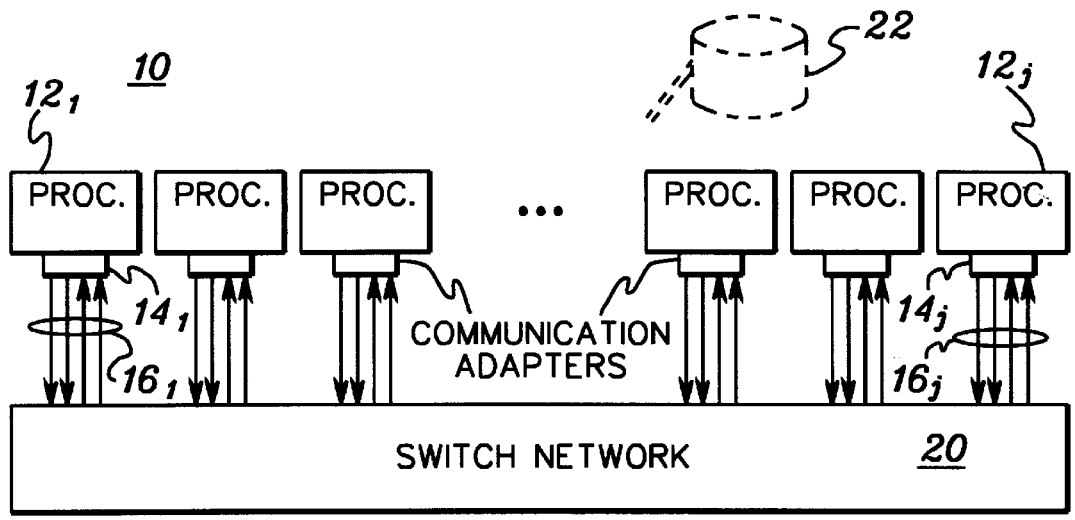
FIG. 1 is an exemplary message processing system in the form of a multiprocessor data processing system having a plurality of processors coupled by a switch network or communication medium.

Generally stated, network transit time is employed herein as an indicator of blocking network congestion. In the context of this invention, a "blocking network" means any tightly coupled or tightly controlled processing network, such as the IBM RISC System/6000 Scalable POWERparallel Systems (SP) Distributed Computer System available from International Business Machines Corporation of Armonk, N.Y. Since protocols typically acknowledge packets that they receive, a sending processor is instructed to record a time stamp upon sending a packet to another processor and also to take a time stamp when the sending processor receives a corresponding acknowledgment from the packet receiver. The difference between these two time stamps is defined as the "round-trip time." The round-trip time is then used to estimate the amount of network congestion.

For example, if the round-trip time is less than some parameter E0, then an assumption is made that there is no network congestion. If the round-trip time is between E0 and E1, then the congestion may be defined as mild, while if the round-trip time is between E1 and E2, the congestion may be defined as medium, and so on. The determination of times E0, E1, E2 . . . (and number of flow control tokens L0, L1, L2 . . . ) is performed during initial tuning. In other words, as part of the initial machine design and configuration, congestion is induced in a controlled fashion in the lab and round trip times are measured for different levels of congestion.

Depending on the level of congestion, a flow control window (i.e., number of flow control tokens) at the sending processor for that particular destination processor can be set. If the time is less than E0, then the flow control window, or packet tokens is set to L0. Note that the concepts of a "flow control window" or "flow control tokens" are understood in the art and comprise an amount of data that a sending processor can send to a particular destination processor before receiving an acknowledgment back, i.e., a replenishment of the packet tokens. The flow control window or tokens concept is used in many communication protocols, including those for dropping networks and blocking networks. In most blocking networks, however, the flow control window or number of tokens available is fixed. For a further discussion of the flow control window or token concepts, reference Volume 1 of a TCP/IP illustrated publication authored by W. Richard Stevens and published by Addison-Wesley, which is available at ISBN 0-201-63346-9, and Volume 2 of the publication authored by Gary R. Wright and W. Richard Stevens, available at ISBN 0-201-63354-X.

Thus, presented herein is the concept of dynamically adjusting the window size or number of flow control tokens depending upon network congestion. For example, if the measured round-trip time is between E0 and E1, then the number of packet tokens is set to L1, and so on. In this example, it is assumed that E0<E1<E2 . . . , and L0>L1>L2 . . . The parameters E0, E1, E2, etc. and L0, L1, L2, etc. are statically determined (i.e., predetermined) for a certain system size. This is possible because the round trip times in a blocking network, as defined above, can be predicted with great accuracy. Therefore, a good estimate of no-load round-trip time is available for the network. Such a system can be contrasted with a TCP/IP network where no estimate of round-trip time is possible because a given connection could be either to an adjacent processor or to a processor half-way across the globe.

As an enhancement on the concepts discussed above, it is possible to record time stamps on packets and corresponding acknowledgments only when the network is suspected to be congested in order that the impact of the cost of congestion avoidance be minimized. Specifically, the communications protocol can maintain state information that says whether the path to a particular destination is congested or not congested. When the protocol has to stall its traffic to a certain destination because the protocol ran out of flow control tokens for the particular destination, then the sender's communication protocol sets the network state to that destination as "congested." If the state is congested, then time stamps are taken and the round-trip times are determined. Again the round-trip times are used by the protocol to vary the window size (or number of tokens) as described above. When the round-trip time eventually drops below E0 (i.e., the predetermined time representative of no network congestion), the protocol sets the number of token packets to L0 (i.e., the predefined maximum number) and the state to "not congested." By doing so, the overhead of taking time stamps during normal operation is eliminated. Also, time stamps need not be taken for every packet that is sent after detection of congestion. For example, time stamps may be only be taken on every $i^{th}$ packet, where $i \geq 2$, and is tunable.

Using round-trip time as an indicator of network congestion is recognized herein to be an approximation since there are other factors that can increase the round-trip time. For instance, the destination task that has to respond with an acknowledgment might have to perform certain processing, for example, service a page fault, before it can respond with the acknowledgment. However, the mechanism summarized herein still works since the round-trip time is a measure of responsiveness of the other side, and therefore, it is preferable to slow down the packets sent into the network when the other side (i.e., destination processor) is less responsive than anticipated.

FIG. 1 depicts an exemplary message processing system in the form of a multiprocessor data processing system 10 having a plurality of processors $12_1$ . . . $12_j$. Each processor may have a respective communication adapter 14 for operating its respective connection 16 to a commonly connected medium or switch network 20. A storage medium 22 may also be provided in the system to hold and/or support application software and all relevant data structures, protocols, etc.

In one example, the multiprocessor data processing system 10 may comprise the above-referenced IBM RISC System/6000 Scalable POWERparallel Systems (SP) Distributed Computer System available from International Business Machines Corporation. As a specific example, an SP computer may have a total of 8 frames, with each frame having up to 16 processor nodes, for a total of 128 processor nodes. Each processor node could comprise a computer itself, such as a RISC System/6000 workstation, also available from International Business Machines Corporation.

All of the nodes of a frame of the SP computer are included in a local area network (LAN) segment which is joined by the other LAN segments through LAN gates. Also connected to the local area network is a control workstation (CWS) which controls operation of the SP computer. The control workstation has a direct access storage device (DASD) referred to as the System Shared Disk on which is stored the system data repository (SDR) files. The SDR files include such information, as a list of nodes that are in the system and their configuration, and includes resources and object definitions for each of the nodes. Each node also may include a DASD device for storing data processed by the SP computer. As is well understood in the art, the CWS node sends system data and control signals to the frames of the SP computer by means of the local area network, while messages and data may be sent from one to another of the processor nodes by means of high performance switches. In such an environment, any processor node could comprise a sending processor, and any processor node could comprise a destination processor (i.e., receiver), as the terms are used in the context of this invention.

Figure 2:
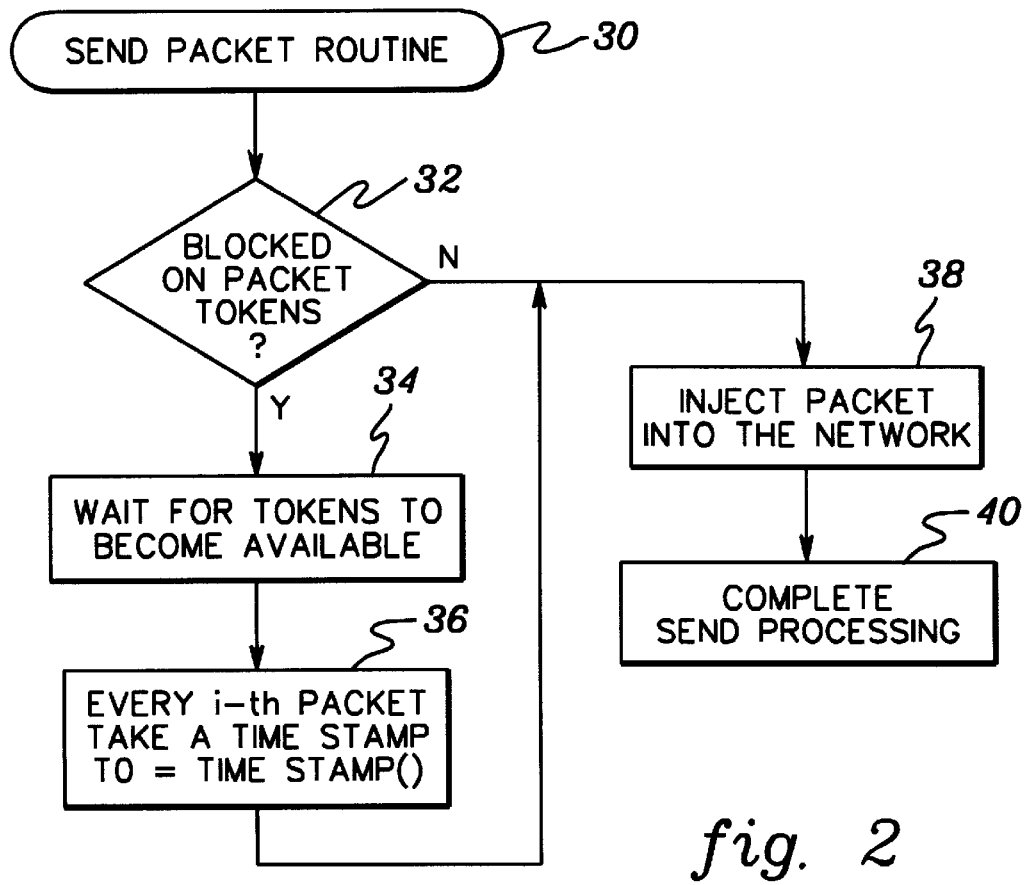
FIG. 2 is a flowchart of a send packet routine for the multiprocessor data processing system of FIG. 1 wherein time stamps are taken every $i^{th}$ packet after a packet send is blocked for lack of flow control tokens, where i is tunable.

A send packet routine 30 is depicted in FIG. 2 which includes initially inquiring whether the sending processor is blocked from sending a packet to a particular destination due to a lack of tokens 32. If so, the communications protocol calls for the sending processor to wait for a packet token(s) to become available 34. Once blocked a "congested" state is set and the sending processor is to take a time stamp of every $i^{th}$ packet sent into the communications network to the particular destination processor 36.

After a token has become, available 34, and a time stamp has been taken for the $i^{th}$ packet 36, the packet is injected into the network 38. Note that if the network is not congested, then the send packet routine of the communications protocol would directly injected the packet into the network 38 using an available token. After the packet has been injected into the network, conventional send processing is completed 40.

Figure 3:
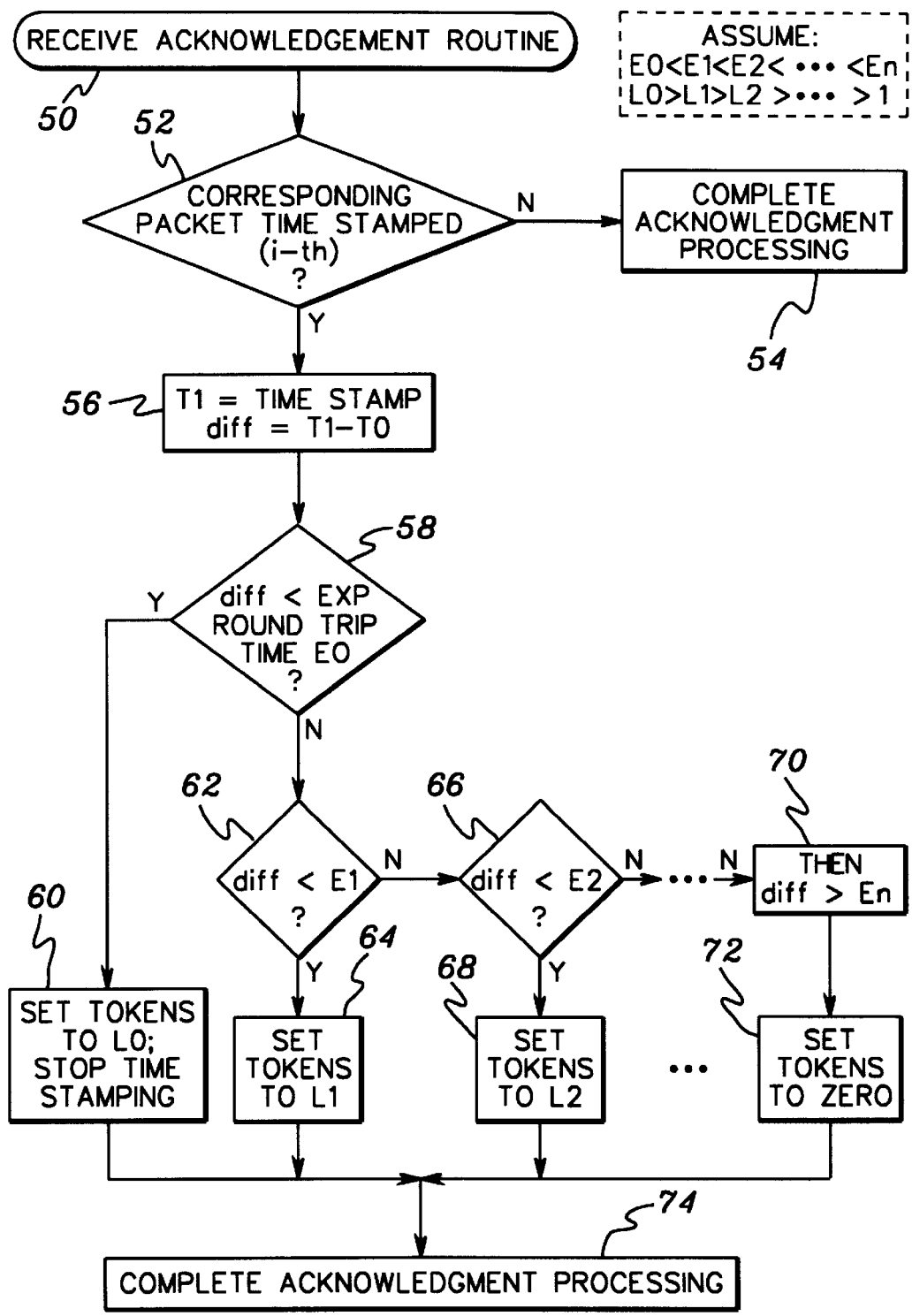
FIG. 3 is a flowchart of, a receive acknowledgment routine for the multiprocessor data processing system of FIG. 1 wherein time stamps are obtained upon receipt of an acknowledgment to a corresponding time stamped $i^{th}$ packet, a round-trip time is determined, (diff), and the number of flow control tokens is set based upon the round-trip time.

FIG. 3 depicts communication protocol for a receive acknowledgment routine 50, which initially determines whether the corresponding packet was time stamped, i.e., is the acknowledgment corresponding to an $i^{th}$ packet transmitted after the sending processor was blocked 52. If not, then conventional acknowledgment processing is performed 54. Otherwise, a time stamp is taken corresponding to receipt of the acknowledgment, and a round-trip time or "diff" is determined by subtracting the packet transmission time stamp T0 from the acknowledgment time stamp T1 56.

The protocol next determines whether the round-trip time (diff) is less than an expected round-trip time E0, where E0 is predetermined to represent a round-trip time within the network indicative of no network congestion. If "yes", then the number of tokens is set to L0, the protocol resets the network flag to "not congested", and stops time stamping every $i^{th}$ packet sent 60. If the round-trip time is greater than the expected round-trip time E0, then the protocol next determines whether the diff is less than a second statically determined value E1 62. In this example, it is assumed that E0<E1<E2<. . . <En, and that L0>L1>L2>. . . >1. Again, if the difference is less than E1, then protocol sets the number of tokens to value L1 64. Otherwise, processing determines whether the difference is less than a next predetermined level E2, and if "yes" sets the number of tokens to L2. The protocol continues in this manner until it is determined that the difference is greater than a predetermined level En of congestion 70, in which case the number of packet tokens is set to 0 72. After setting the number of tokens, conventional acknowledgment processing is completed 74.

Note that in the above example, n predetermined values or ranges are used to dynamically set the number of packet tokens to be used by the sending processor in communicating with a particular destination after the network has been identified as congested. If desired, this concept could be limited to only one or two predetermined values (e.g., E0 & E1). Because the above-summarized technique is protocol-based, it can be readily implemented on existing blocking networks. Those skilled in the art will also note from the description provided that the mechanism disclosed can be employed in connection with any tightly coupled, or tightly controlled network.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for monitoring congestion in a network, said method comprising:
    prior to monitoring congestion in a network, predetermining at least one round trip time representative of no network congestion or a known degree of network congestion, said monitoring comprising:
    sending a packet into said network, and recording a first time stamp based thereon;
    receiving an acknowledgment back across said network responsive to said packet, and recording a second time stamp with receipt of said acknowledgment;
    determining a round trip time of said packet and acknowledgment across said network using said first time stamp and said second time stamp, wherein said round trip time is indicative of an amount of congestion in said network; and
    estimating said amount of congestion in said network using said determined round trip time, wherein said estimating comprises comparing said determined round trip time with the predetermined round trip time representative of no network congestion or a known degree of network congestion.

2. The method of claim 1, wherein said network comprises a blocking network.

3. The method of claim 1, wherein said sending comprises sending said packet from a sending node, and wherein said method further comprises dynamically setting a number of flow control tokens at said sending node responsive to a level of network congestion represented by said determined round trip time.

4. The method of claim 1, further comprising comparing said determined round trip time with a plurality of predetermined round trip times, each predetermined round trip time being representative of a different extent of network congestion, and setting a number of flow control tokens for use in sending packets from a sender node to a destination node, said sender node sending said packet to said destination node and receiving said acknowledgment therefrom.

5. The method of claim 4, wherein said sending of said packet requires availability of a flow control token at said sender node for said destination node, and wherein said method further comprises dynamically setting said number of flow control tokens after said sender node is blocked from sending a packet due to unavailability of a flow control token.

6. The method of claim 1, further comprising identifying that said network is in a congested state prior to said recording of said first time stamp, said recording of said second time stamp, and said determining of said round trip time.

7. The method of claim 6, wherein said identifying comprises determining that said sending of said flow control packet into said network is blocked due to a lack of flow control tokens for sending packets between a sender node and a destination node.

8. The method of claim 7, further comprising identifying when said network is no longer in a congested state between said sender node and said destination node, and discontinuing said recording of said first time stamp, said second time stamp, and said determining of said round trip time once said network is no longer congested.

9. A method for ameliorating congestion in a network, said method comprising:
    identifying when said network is in a congested state between a sender node and a destination node, said congested state meaning that said sender node is blocked from sending a packet due to unavailability of a flow control token, wherein sending of a packet requires availability of a flow control token at said sender node for said destination node;
    subsequent to said identifying, ascertaining a round trip time of a packet and corresponding return acknowledgment sent between said sender node and said destination node across said network; and
    varying a number of flow control tokens at said sender node for said destination node using said ascertained round trip time.

10. The method of claim 9, further comprising repeating said ascertaining and said varying for every $i^{th}$ packet sent across said network from said sender node to said destination node, wherein $i \geq 1$.

11. The method of claim 9, wherein said identifying comprises determining that said sender node is blocked from sending a packet to said destination node due to insufficient flow control tokens.

12. The method of claim 11, wherein said network comprises a blocking network and said varying comprises comparing said ascertained round trip time with at least one predetermined round trip time to ascertain an extent of network congestion and to set therefrom said number of flow control tokens.

13. The method of claim 9, further comprising identifying when said network is no longer congested between said sender node and said destination node, and discontinuing said ascertaining of said round trip time and said varying of the number of flow control tokens subsequent thereto.

14. A system for monitoring congestion in a network, said system comprising:
- means for predetermining at least one round trip time prior to monitoring congestion in a network, said at least one round trip time being representative of no network congestion or a known degree of network congestion said monitoring comprising:
- means for sending a packet into said network and for recording a first time stamp based thereon;
- means for receiving an acknowledgment back across said network responsive to said packet, and for recording a second time stamp with receipt of said acknowledgment;
- means for determining a round trip time of said packet and said acknowledgment across said network using said first time stamp and said second time stamp, wherein said round trip time is indicative of an amount of congestion in said network; and
- means for estimating said amount of congestion in said network using said determined round trip time, wherein said means for estimating comprises means for comparing said determined round trip time with the at least one a predetermined round trip time representative of no network congestion or a known amount of network congestion.

15. The system of claim 14, wherein said network comprises a blocking network.

16. The system of claim 14, wherein said means for sending comprises means for sending said packet from a sending node, and wherein said system further comprises means for dynamically setting a number of flow control tokens at said sending node responsive to said amount of congestion in said network.

17. The system of claim 14, further comprising means for comparing said determined round trip time with a plurality of predetermined round trip times, each predetermined round trip time being representative of a different extent of network congestion between a sender node and a destination node, and means for setting a number of flow control tokens for use in sending packets from said sender node to said destination node, said sender node sending said packet to said destination node and receiving said acknowledgment therefrom.

18. The system of claim 17, wherein said sending of said packet requires availability of a flow control token at said sender node for said destination node, and wherein said system further comprises means for dynamically setting said number of flow control tokens after said sender node is blocked from sending a packet due to unavailability of a flow control token.

19. The system of claim 14, further comprising means for identifying that said network is in a congested state prior to said recording of said first time stamp, said recording of said second time stamp, and said determining of said round trip time.

20. The system of claim 19, wherein said means for identifying comprises means for determining that said sending of said packet into said network is blocked due to a lack of flow control tokens for sending packets between a sender node and a destination node.

21. The system of claim 20, further comprising means for identifying when said network is no longer in a congested stated between said sender node and said destination node, and for discontinuing said recording of said first time stamp, said second time stamp, and said determining of said round trip time once said network is no longer congested between said sender node and said destination node.

22. A system for ameliorating congestion in a network, said system comprising:
- means for identifying when said network is in a congested state between a sender node and a destination node, said congested state meaning that said sender node is blocked from sending a packet due to unavailability of a flow control token, wherein sending of a packet requires availability of a flow control token at said sender node for said destination node,
- means for ascertaining a round trip time of a packet and a corresponding return acknowledgment sent between said sender node and said destination across a network after identifying that said network is congested therebetween; and
- means for varying a number of flow control tokens at said sender node for said destination node using said ascertained round trip time.

23. The system of claim 22, further comprising means for repeating said means for ascertaining and said means for varying for every $i^{th}$ packet sent into said network from said sender node to said destination node, wherein $i \geq 1$.

24. The system of claim 22, wherein said means for identifying comprises means for determining that said sender node is blocked from sending a packet to said destination node due to insufficient flow control tokens.

25. The system of claim 24, wherein said network comprises a blocking network, and wherein said means for varying comprises means for comparing said ascertained round trip time with at least one predetermined round trip time to ascertain an extent of network congestion and to set therefrom, said number of flow control tokens.

26. The system of claim 22, further comprising means for identifying when said network is no longer congested between said sender node and said destination node, and for discontinuing said ascertaining of said round trip time and said varying of the number of flow control tokens subsequent thereto.

27. At least one program storage device readable by a machine, tangibly embodying at least one program of instructions executable by the machine to perform a method of monitoring congestion in a network, comprising;
- prior to monitoring congestion in a network predetermining at least one round trip time representative of no network congestion or a known degree of network congestion said monitoring comprising:
- sending a packet into said network, and recording a first time stamp based thereon;
- receiving an acknowledgment back across said network responsive to said packet, and recording a second time stamp with receipt of said acknowledgment;
- determining a round trip time of said packet and acknowledgment across said network using said first time stamp and said second time stamp, wherein said round trip time is indicative of an amount of congestion in said network; and
- estimating said amount of congestion in said network using said determined round trip time, wherein said estimating comprises comparing said determined round trip time with the at least one a predetermined round trip time representative of no network congestion or a known degree of network congestion.

28. The at least one program storage device of claim 27, wherein said network comprises a blocking network.

29. The at least one program storage device of claim 27, wherein said sending comprises sending said packet from a sending node, and further comprising dynamically setting a number of flow control tokens at said sending node responsive to a level of network congestion represented by said determined round trip time.

30. The at least one program storage device of claim 27, further comprising comparing said determined round trip time with a plurality of predetermined round trip times, each predetermined round trip time being representative of a different extent of network congestion, and setting a number of flow control tokens for use in sending packets from a sender node to a destination node, said sender node sending said packet to said destination node and receiving said acknowledgment therefrom.

31. The at least one program storage device of claim 30, wherein said sending of said packet requires availability of a flow control token at said sender node for said destination node, and further comprising dynamically setting said number of flow control tokens after said sender node is blocked from sending a packet due to unavailability of a flow control token.

32. The at least one program storage device of claim 27, further comprising identifying that said network is in a congested state prior to said recording of said first time stamp, said recording of said second time stamp, and said determining of said round trip time.

33. The at least one program storage device of claim 32, wherein said identifying comprises determining that said sending of said packet into said network is blocked due to a lack of flow control tokens for sending packets between a sender node and a destination node.

34. The at least one program storage device of claim 33, further comprising identifying when said network is no longer in a congested state between said sender node and said destination node, and responsive thereto, discontinuing said recording of said first time stamp, said second time stamp, and said determining of said round trip time.

35. At least one program storage device readable by a machine, tangibly embodying at least one program of instructions executable by the machine to perform a method of ameliorating congestion in a network, comprising:
  identifying when said network is in a congested state between a sender node and a destination node, said congested state meaning that said sender node is blocked from sending a packet due to unavailability of a flow control token, wherein sending of a packet requires availability of a flow control token at said sender node for said destination node;
  subsequent to said identifying, ascertaining a round trip time of a packet and corresponding return acknowledgment sent between said sender node and said destination node across said network; and
  varying a number of flow control tokens at said sender node for said destination node using said ascertained round trip time.

36. The at least one program storage device of claim 35, further comprising repeating said ascertaining and said varying for every $i^{th}$ packet sent across a network from said sender node to said destination node, wherein $i \geq 1$.

37. The at least one program storage device of claim 35, wherein said identifying comprises determining that said sender node is blocked from sending a packet to said destination node due to insufficient flow control tokens.

38. The at least one program storage device of claim 37, wherein said network comprises a blocking network and said varying comprises comparing said ascertained round trip time with at least one predetermined round trip time to ascertain an extent of network congestion and to set therefrom said number of flow control tokens.

39. The at least one program storage device of claim 35, further comprising identifying when said network is no longer congested between said sender node and said destination node, and discontinuing said ascertaining of said round trip time and said varying of the number of flow control tokens subsequent thereto.

40. A processing system comprising:
  a plurality of processing nodes, said plurality of processing nodes including a sender node and a receiver node;
  a network coupling said plurality of processor nodes for transferring packets and acknowledgments therebetween;
  said sender node comprising a processor adapted to:
    store at least one predetermined round trip time representative of no network congestion or a known degree of network congestion, said at least one round trip time being predetermined prior to monitoring congestion in a network;
  send a packet across said network to said destination node and record a first time stamp based thereon;
  receive an acknowledgment back across said network responsive to said packet, and record a second time stamp with receipt of said acknowledgment;
  determine a round trip time of the packet and the acknowledgment across the network using the first time stamp and the second time stamp, wherein the round trip time is indicative of an amount of congestion in the network; and
  estimate the amount of congestion in the network using the determined round trip time, wherein the estimating comprises comparing the determined round trip time with the at least one predetermined round trip time representative of no network congestion or a known degree of network congestion.

41. A processing system comprising:
  a plurality of processing nodes, said plurality of processing nodes including a sender node and a destination node;
  a network coupling said plurality of processor nodes for transferring packets and acknowledgments therebetween;
  said sender node comprising a processor adapted to:
    identify when the network is in a congested state between the sender node and the destination node, said congested state meaning that said sender node is blocked from sending a packet due to unavailability of a flow control token, wherein sending of a packet requires availability of a flow control token at said sender node for said destination node;
    subsequent to the identifying, ascertain a round trip time of the packet and corresponding return acknowledgment sent between the sender node and the destination across the network; and
    vary a number of flow control tokens at the sender node for the destination node using the ascertained round trip time.

* * * * *